United States Patent [19]

Bergquist

[11] Patent Number: 5,236,114
[45] Date of Patent: Aug. 17, 1993

[54] CARRIER BASKET
[75] Inventor: Per Bergquist, Gislaved, Sweden
[73] Assignee: Industri AB Thule, Hillerstorp, Sweden
[21] Appl. No.: 669,688
[22] Filed: Mar. 14, 1991
[30] Foreign Application Priority Data
Mar. 14, 1990 [SE] Sweden .............................. 9000907
[51] Int. Cl.⁵ .............................................. B60R 9/04
[52] U.S. Cl. .................................... 224/314; 224/309; 224/325; 403/252; 403/197; 403/329
[58] Field of Search ................................ 224/327-331, 224/316, 318, 319, 309, 314, 315, 322, 325, 326, 320, 321; 414/462; 248/408, 409, 682, 689; 403/192, 197, 252, 255, 263, 329, 330

[56] References Cited
U.S. PATENT DOCUMENTS

| | | | |
|---|---|---|---|
| 4,063,836 | 12/1977 | Militano | 403/263 |
| 4,225,068 | 9/1980 | Ingram | 224/325 |
| 4,239,138 | 12/1980 | Kowalski | 224/321 |
| 4,269,340 | 5/1981 | Kowalski et al. | 224/326 |
| 4,295,588 | 10/1981 | Kowalski et al. | 224/321 |
| 4,473,178 | 9/1984 | Bott | 224/325 X |
| 4,577,837 | 3/1986 | Berg et al. | 248/408 X |
| 4,588,227 | 5/1986 | Austin | 403/255 X |
| 4,848,629 | 7/1989 | Mobius | 224/315 |
| 4,911,348 | 3/1990 | Rasor et al. | 224/321 |

FOREIGN PATENT DOCUMENTS

| | | |
|---|---|---|
| 1906086 | 8/1970 | Fed. Rep. of Germany . |
| 2939672A1 | 4/1981 | Fed. Rep. of Germany . |
| 2946533A1 | 5/1981 | Fed. Rep. of Germany . |
| 3102736A1 | 9/1982 | Fed. Rep. of Germany . |
| 3611136 | 10/1987 | Fed. Rep. of Germany ...... 224/325 |
| 0513793 | 2/1955 | Italy .................................... 224/325 |
| 0672749 | 10/1964 | Italy .................................... 224/325 |

Primary Examiner—Henry J. Recla
Assistant Examiner—Casey Jacyna
Attorney, Agent, or Firm—Burns, Doane, Swecker & Mathis

[57] ABSTRACT

A carrier basket which is intended to be secured on a vehicle roof comprises two longitudinal profile members between which extend a number of rods which form a load-carrying surface in the carrier basket. In order to eliminate the need for loose small parts on assembly and dismantling of the carrier basket, the rods are releasably connected to the profile members by snap catch connections. The snap catch connections are formed by locking heel disposed at the ends of the rods, the heel extending, in a rest position, outside the cross-section of the rod and being, against the action of spring force, depressable inside the cross-section. The rod extends through an opening in one wall of the profile member and has the locking heel inside the opening, and one end in abutment against the inside of the opposing wall of the profile member.

13 Claims, 2 Drawing Sheets

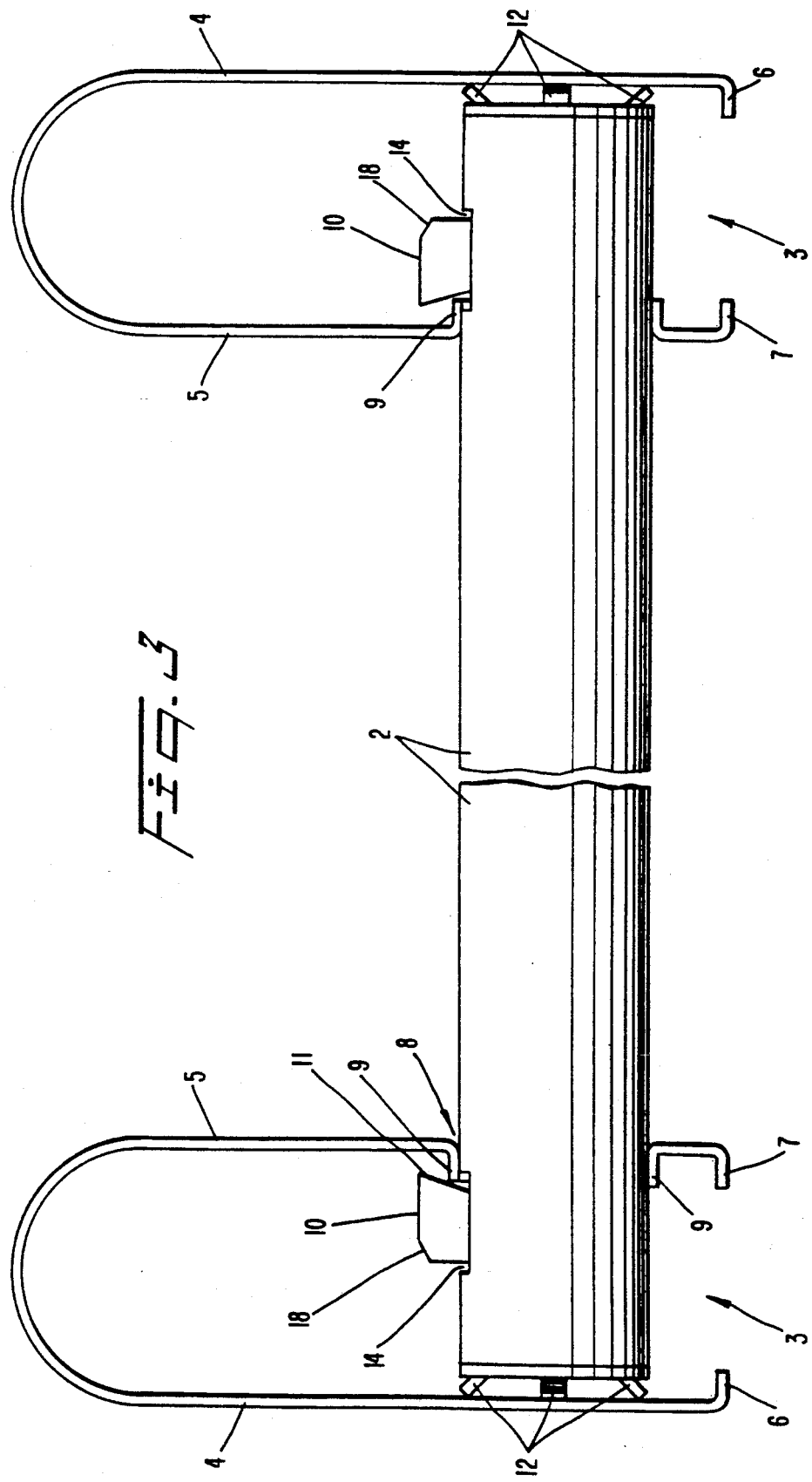

CARRIER BASKET

BACKGROUND OF THE INVENTION

1. Field of the Invention

The present invention relates to a carrier basket of the type which is intended to be secured on a vehicle roof and which comprises two profile members between which extend rods forming a load carrying surface in the carrier basket.

2. Description of the Prior Art

Carrier baskets of the above-mentioned type are known in this art in many variations. In one such prior art carrier basket, the profile members are designed as upright, approximately U-shaped beams with the opening facing downwards. These beams run in the longitudinal direction of the vehicle which is provided with the carrier basket, and the mutually facing surfaces of the beams are provided with openings in which tubes are inserted and screwed in position by means of screws which extend through the outer side of the profile member and in to anchorage plugs in the ends of the rods.

A carrier basket of this type consists of a large number of different parts and, consequently, requires a relatively long time for its assembly and mounting. However, once it has been assembled and mounted, it functions in a satisfactory manner.

The above-described carrier basket cannot, without considerable effort, once again be dismounted and dismantled and, in such event, there is always the risk that small parts such as loose screws, washers or the like may get lost. Hence, it is hardly realistic to store the prior art carrier basket in the dismantled state. As a result, it will be bulky to store when not in use on the vehicle.

SUMMARY OF THE INVENTION

The object of the present invention is to realize a carrier basket of the type mentioned by way of introduction, the carrier basket being designed in such a manner as to obviate the above-outlined drawbacks inherent in prior art carrier baskets. Thus, the present invention has for its object realizing a carrier basket which, for its assembly and mounting, is not dependent upon a large number of loose small parts. The present invention further has for its object realizing a carrier basket which may readily and rapidly be assembled and mounted but may also subsequently be dismantled and stored in the dismantled state with but slight space requirements and without the risk that loose small parts may get lost. Finally, the present invention has for its object realizing a carrierbasket which is simple and economical in manufacture and offers a high degree of mechanical strength and high load-carrying capacity.

The objects forming the basis of the present invention will be attained if the carrier basket intimated by way of introduction is characterized in that the rods are releasably connected to the profile members by the intermediary of snap, locking catch, bayonet or plug connections.

This design of the carrier basket makes for rapid and easy assembly. Furthermore, once assembled and mounted, the carrier basket may simply be dismantled once again so that it can be stored with slight space requirements. The carrier basket according to the present invention also eliminates the need for loose small parts such as screws and washers for its assembly.

According to one preferred embodiment of the present invention, the snap, locking catch or bayonet connection is also formed by a locking heel disposed at the ends of the rods and, in a rest position, protruding outside the cross-section of the rod while being depressable, against spring force, inside the cross-section of the rod, the rod extending, in the mounted state in the profile member, through an opening in the profile member, the locking heel abutting thereagainst.

Other objects, advantages and applications of the present invention will become apparent from the following description, reference being had to the accompanying drawings wherein a preferred form of an embodiment of the invention is clearly shown.

BRIEF DESCRIPTION OF THE ACCOMPANYING DRAWINGS

The present invention will now be described in greater detail hereinbelow, reference being made to the accompanying drawing wherein like reference numerals refer to like parts throughout the two views, and wherein FIG. 1 is a vertical cross-section through a profile member included in the carrier basket, in which a transverse rod is secured in the profile member;

FIG. 2 shows a plastic sleeve which is disposed interiorly in the rod illustrated in FIG. 1 and is provided with the locking heel, and FIG. 3 is a vertical cross-section through the carrier basket showing two profiled members arranged on each end of a rod.

DESCRIPTION OF PREFERRED EMBODIMENT

Figure 1:
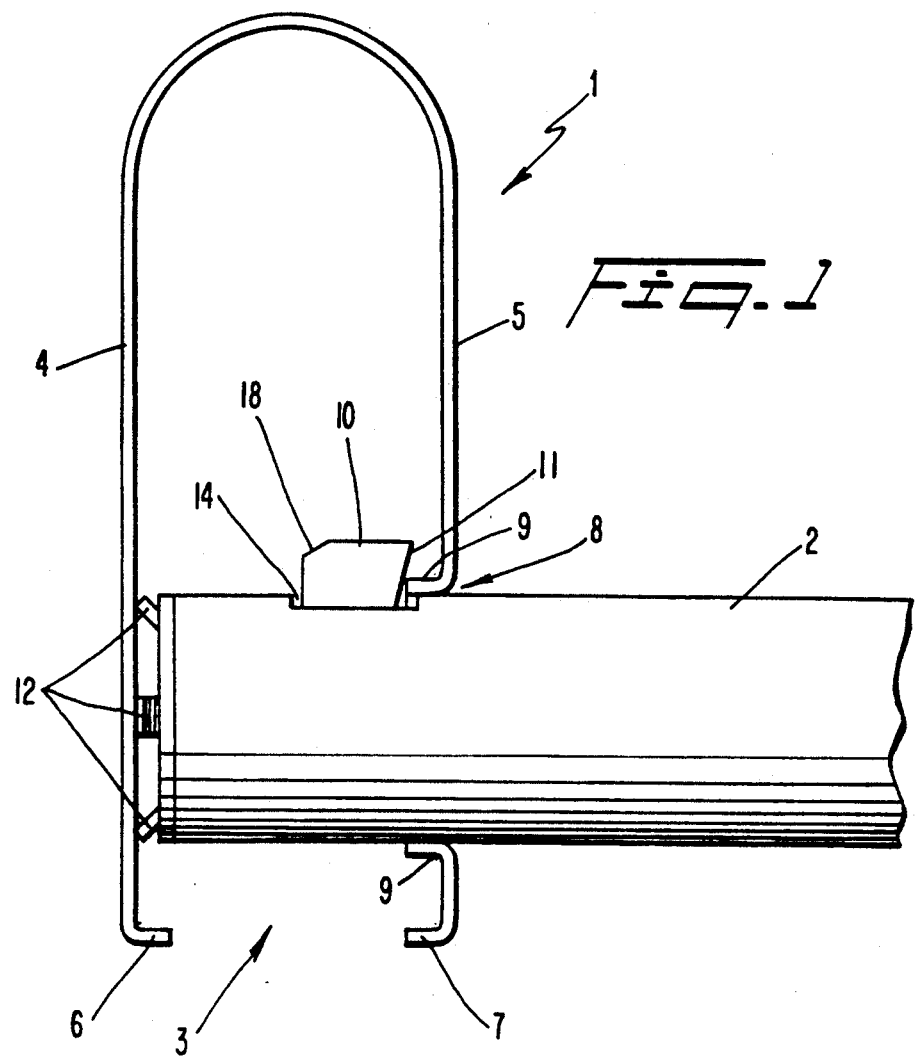

Referring to the drawing, and in particular to FIG. 1, a carrier basket of the type under consideration here is provided with two spaced-apart, approximately one meter long profile members 1 which are of approximately U-shaped cross-section with a slot-shaped aperture 3 facing downwardly. The profile members have an outer side wall 4 and an inner side wall 5 which are approximately parallel to one another and have, at their lower edges, inwardly folded portions 6 and 7, respectively, which define the slot-shaped aperture 3. As a result of this design, the profile member will enjoy a high load carrying capacity in the vertical direction and it is also of such height as to be capable of acting as side support or side wall for the carrier basket.

A suitable anchorage is secured in the slot-shaped aperture 3 in each profile member 1, the anchorage in turn securing the profile members to load struts of the type which is normally employed on vehicles for transporting different loads.

The inner walls 5 of the profile members 1 are provided, at their lower edges, with a series of openings 8 which are surrounded by inwardly directed inward flanges 9. In these openings, rods 2 are inserted and, in the illustrated embodiment, consist of circular steel tubing with an outer coating of semi-hard plastic. Thus, when the carrier basket is in use, the rods 2 extend approximately parallel to the load struts and transversely of the longitudinal direction of the vehicle. These rods form a load-carrying surface at the bottom of the carrier basket.

At the forward and rear ends of the profile members (in the direction of travel of the vehicle), there are provided connection portions which are parallel to the rods 2 but are located higher than the rods and preferably flush with the upper edges of the profile members.

These transverse portions form the front and rear edge of the carrier basket.

In certain cases, the profile members 1 may also be placed transversely of the direction of travel of the vehicle and the rods 2 be disposed longitudinally therewith.

Thus far, the carrier basket as described above may be considered as fully conventional.

According to the invention, the rods are provided, in their ends, with prefitted coupling devices in the form of snap-, locking-, bayonet-, or plug catches or the like, by means of which the rods are releasably secured in the openings 8 in the profile members 1. Hereby, loose small parts for securing the rods in the profile members will be avoided, and the fastening may also readily be opened for dismantling of the carrier basket.

In the embodiment illustrated in FIG. 1, these coupling devices or connection portions for releasable fastening of the rods 2 in the profile members 1 consist inter alia of a locking heel 10 which, in an outer rest position, extends outside the cross-section of the rod 2. The locking heel 10 is depressable in the rod 2 against spring force so that it will be located inside the cross-section of the rod. The locking heel is placed in such a manner that it abuts, with a rear locking surface 11, against an interior surface of the profile member, preferably the edge of the inward flange 9. In this position, the locking heel 10 thus prevents withdrawal of the rod 2 out of the profile member 1.

For securing the rod 2 in the profile member 1, the locking heel 10 is simply pressed down interiorly into the rod so that the end portion of the rod with the locking heel may be passed through the opening 8. When the rod has, thus, been inserted in the profile member, the locking heel 10 will snap back out and, in such instance, lock the rod 2 against withdrawal.

Figure 2:
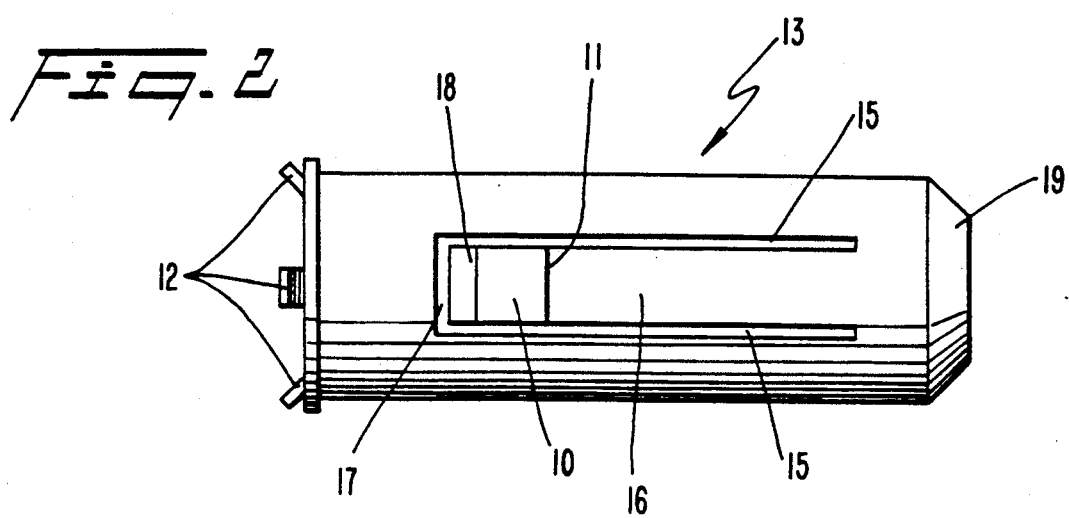

In order that the rod 2 may be fixed securely in the profile member 1 and not vibrate or rattle, the rod 2 is provided, in its end, with abutment portions 12 which are slightly resilient and abut against the inside of the outer wall 4 of the profile member. FIG. 2 shows a sleeve 13 manufactured of plastic, the sleeve being inserted interiorly in an end portion of the rod 2 and being provided with the locking heel 10. In this instance, the locking heel protrudes through an aperture 14 (see FIG. 1) in the casing surface of the rod.

According to the invention, the outer surface of the sleeve 13 is complementary to the inner configuration of the rod 2. This implies, in this embodiment, that the sleeve has an outer circular-cylindrical surface if the rod is produced from a circular tube, while it may be square in cross-section if the rod is produced from square tubing. Furthermore, the sleeve 13 has a chamfer 19 at its inner end, facilitating insertion of the sleeve in the end of the rod 2.

In its casing surface, the sleeve 13 has two axially directed, preferably parallel through slots 15 forming therebetween a tongue 16 which, in its end facing away from the chamfer 19, carries the locking heel 10. In order that the tongue 16 may be capable of yielding so that the locking heel 10 moves approximately radially in relation to the sleeve, the outer ends of the slots 15 are interconnected by the intermediary of a transverse slot 17.

While not being apparent from the Drawing, the sleeve 13 is provided with a longitudinal inner bore of at least sufficient diameter that the locking heel 10 may be inserted such a distance that the locking heel will also be located inside the outer casing surface of the sleeve 13. This is necessary, since otherwise it would not be possible to slide the sleeve into the end portion of the rod 2 in order thereafter to snap out through the aperture 14 in the wall of the rod.

It will further be apparent from FIG. 2 that the outer end of the sleeve 13 has obliquely directed projections which form the above-considered abutment portions 12 conferring the contemplated vibration damping and resilience action when they abut against the outer wall 4 of the profile member 1. The detailed appearance of these abutment portions may vary, and similarly the resilience length. In the unloaded state, they should not extend outside the transverse dimension of the rod 2, since otherwise they would impede or prevent insertion of the rod 2 in the opening 8.

It will be apparent from FIG. 1 that the locking surface 11 on the locking heel 10 is not perpendicular to the sleeve 13, but rather, inclines so that the outer end of the locking surface is closer to the inner wall 5 of the profile member than is the case of the portion of the locking surface located closest to the casing surface of the rod. The reason for this oblique inclination of the locking surface is that, on attempted axial withdrawal of the rod 2 out of the profile member 1, the tongue 16 will be subjected to a bending which strives to rotate the locking surface slightly in the counterclockwise direction. If, in such instance, the locking surface lay in a radial plane to the rod 2, this rotation would have as a consequence that the locking surface (because of the resilience) would assume an inclination which is directly opposite to that shown in FIG. 1, for which reason a wedging effect would occur forcing the locking heel 10 down into the rod 2 so that, thereafter, the rod could be withdrawn.

In order to facilitate insertion of the rod 2 in the profile member 1, the forward end of the locking heel 10 is suitably provided with a chamfer 18. On assembly of the carrier basket according to the present invention, the locking heel 10 is manually depressed on one rod at a time, whereafter the rod is slid into the opening 8 in the profile member 1. Once in the profile member, the locking heel 10 will snap out to the position illustrated in FIG. 1 where it retains the rod in the profile member. When all of the rods have been secured in this manner in the one profile member, the locking heel on that rod which is located most proximal one end of the carrier basket is depressed and the second profile member is secured. Thereafter, the locking heel on the adjacent rod is depressed and the profile member is pressed down over this locking heel, whereafter this procedure is repeated until all locking heels have snapped into the second profile member.

On dismantling of a carrier basket, the rods 2 are rotated so that the locking heels are turned to face towards the slot-shaped aperture 3 where the locking heels may readily be depressed using a suitable object so that they no longer prevent withdrawal of the rod 2.

DESCRIPTION OF ALTERNATIVE EMBODIMENTS

According to the invention, the profile members need not have the cross-sectional configuration shown on the Drawing. It is fully conceivable that a profile member could have the configuration of an I beam, in which the rods 2 extend through the web of the beam. In order to achieve this in a simple manner, the rod may suitably be provided with a fixed abutment which abuts against the inside of the web, while the snap connection snaps into the outside of the web. Naturally, two locking heels may also be resiliently disposed independent of each other, one on each side of the beam web.

If the profile member has the configuration shown in FIG. 1, a fixed abutment may also be employed in this case and abut against the inside 5 of the profile member, while the locking heel 10 may be placed on the outside of the outer wall 4 of the profile member so that thereby both the outer wall and the inner wall have through openings corresponding to the opening 8 illustrated in FIG. 1. Also in this case, the fixed abutment may, naturally, be substituted by a resilient locking heel.

According to the invention, the locking heel may also be of somewhat longer length in the longitudinal direction of the rod than that illustrated in the drawings. In such a case, the locking heel may be provided with a transverse groove in which may be accommodated an edge portion of that wall which surrounds the hole through which the rod 2 extends. The width of this groove is then adapted so as to be capable of straddling about the wall material around the hole or inward flange 9.

In FIG. 2, the outer end of the sleeve 13 has been illustrated as closed. In order to simplify manufacture of the sleeve and eliminate the need for sliding jaws in the plastic production tool in which the sleeve is injection moulded, it is possible to extend the slots 15 right up to the outer end of the sleeve. In this case, the transverse groove 17 will, thus, be dispensed with, as well as the material between this groove and the outer end of the sleeve.

I claim:

1. A carrier basket of the type which is intended to be secured on a vehicle roof, comprising:
   two profiled members having a plurality of rods extending therebetween, said rods forming a load carrying surface in the basket;
   a plurality of openings in mutually facing surfaces of the profiled members, each opening receiving an end portion of a rod;
   a plurality of locking heels, a locking heel being arranged on end portions of each of the rods, said locking heels extending laterally through an aperture in a wall of the associated rod for preventing said end portion of said associated rod from being withdrawn from the opening;
   a plurality of sleeve members, one sleeve member being inserted into an end portion of each of the rods, each of said sleeve members having a longitudinally extending tongue formed in said sleeve member by means of slots in a wall of the sleeve member, said locking heel being supported by a free end portion of said tongue to extend laterally through the aperture.

2. The carrier basket of claim 1, wherein each profiled member has an inner and outer wall which are separated by a space, said inner walls having the openings for the rods.

3. The carrier basket of claim 2, further comprising abutment means for resiliently abutting the outer walls, said abutment means being formed on an end of each of said sleeve members.

4. The carrier basket as claimed in claim 1, wherein said rods are provided with an abutment which is longitudinally spaced from the locking heel, the locking heel and the abutment being located on opposing sides of a wall of the profiled member in a fixed position of the rod in the profiled member.

5. The carrier basket as claimed in claim 1 wherein the locking heel has a recess for accommodating a portion of a wall in the profiled member.

6. A carrier basket of a type which is intended to be secured on a vehicle roof, comprising:
   two profiled members each having an inner wall and an outer wall which are separated by a space, said inner walls having opening for receiving end portions of a plurality of rods which extend between the two profiled members and form a load carrying surface;
   a plurality of locking heels, a locking heel being arranged on one end portion of each of the rods, said locking heels being depressible against spring means to a position inside the circumference of the rod for allowing the locking heels to be inserted into said space between the inner wall and the outer wall of the profiled members and for allowing the locking heels to snap back to another position outside the circumference of the rod inside said space;
   abutment means extending from said one end portion of said rods to abut an inner side of the outer wall for keeping the locking heels in contact with an inner side of the inner wall; and
   wherein said locking heels are provided on sleeve members inserted into the end portions of the rods, said locking heels extending laterally through an aperture in a wall of the rods.

7. The carrier basket of claim 6, wherein each of the sleeve members has a longitudinally extending tongue formed in a wall of the sleeve member by means of slots therein, said tongues having a spring action in a transverse direction to the sleeve members, said locking heels being arranged at a free end of said tongues.

8. The carrier basket of claim 6, wherein said abutment means are provided on the sleeve members.

9. The carrier basket of claim 8, wherein said abutment means are in the form of resilient projections provided on an end surface of the sleeve members.

10. A carrier basket of the type which is intended to be secured on a vehicle roof, comprising:
    two profiled members having an inner wall and an outer wall which are separated by a space, said inner walls having openings for receiving end portions of a plurality of rods which extend between the profiled members and form a load carrying surface in the basket;
    a plurality of sleeve members, a sleeve member being inserted into one end portion of each of the rods, said sleeve members including abutment means extending from said one end portion of each of the rods, for abutting an inner surface of the outer walls and for biasing the rods away from said outer walls, said sleeve members further including a locking heel extending transversely of an associated rod out through apertures in the walls thereof, said locking heels abutting the inner surface of the inner wall of the profiled members for preventing withdrawal of the rods from the profiled members; and
    wherein each of the sleeve members has a longitudinally extending tongue formed in a wall of the sleeve member by means of slots therein, said tongues having spring action in a transverse direction to the sleeve members, said locking heels being arranged at a free end of said tongues.

11. The carrier basket of claim 10, wherein said abutment means includes projections extending from end surfaces of the sleeve members.

12. A roof-top carrier, comprising:
a rod with two ends having a hole arranged in its outer peripheral surface near one end;
a profiled member for engaging the rod at each end, each profiled member having two walls, one of said walls having an opening for receiving said one end of the rod so that the hole is arranged between the two walls;
a sleeve member arranged in said rod; and
said sleeve member including means, protruding from said sleeve through said hole in the outer peripheral surface of said rod, for securing said rod to said profiled member;
wherein said securing means includes a locking heel which is supported by means for urging said locking heel out of said rod through said hole; and
wherein said sleeve further includes means, abutting the other one of said two walls of said profiled member when said rod is received in said opening, for urging said locking heel into contact with said one wall.

13. A roof-top carrier as claimed in claim 12, wherein said urging means includes resilient abutment portions arranged on one end of said sleeve.

* * * * *